April 6, 1948. W. H. JACKSON 2,439,304
AEROPLANE EMPENNAGE
Filed Feb. 1, 1943 5 Sheets-Sheet 2

Inventor
William H. Jackson
By Clarence A. O'Brien
and Harvey B. Jacobson
Attorneys

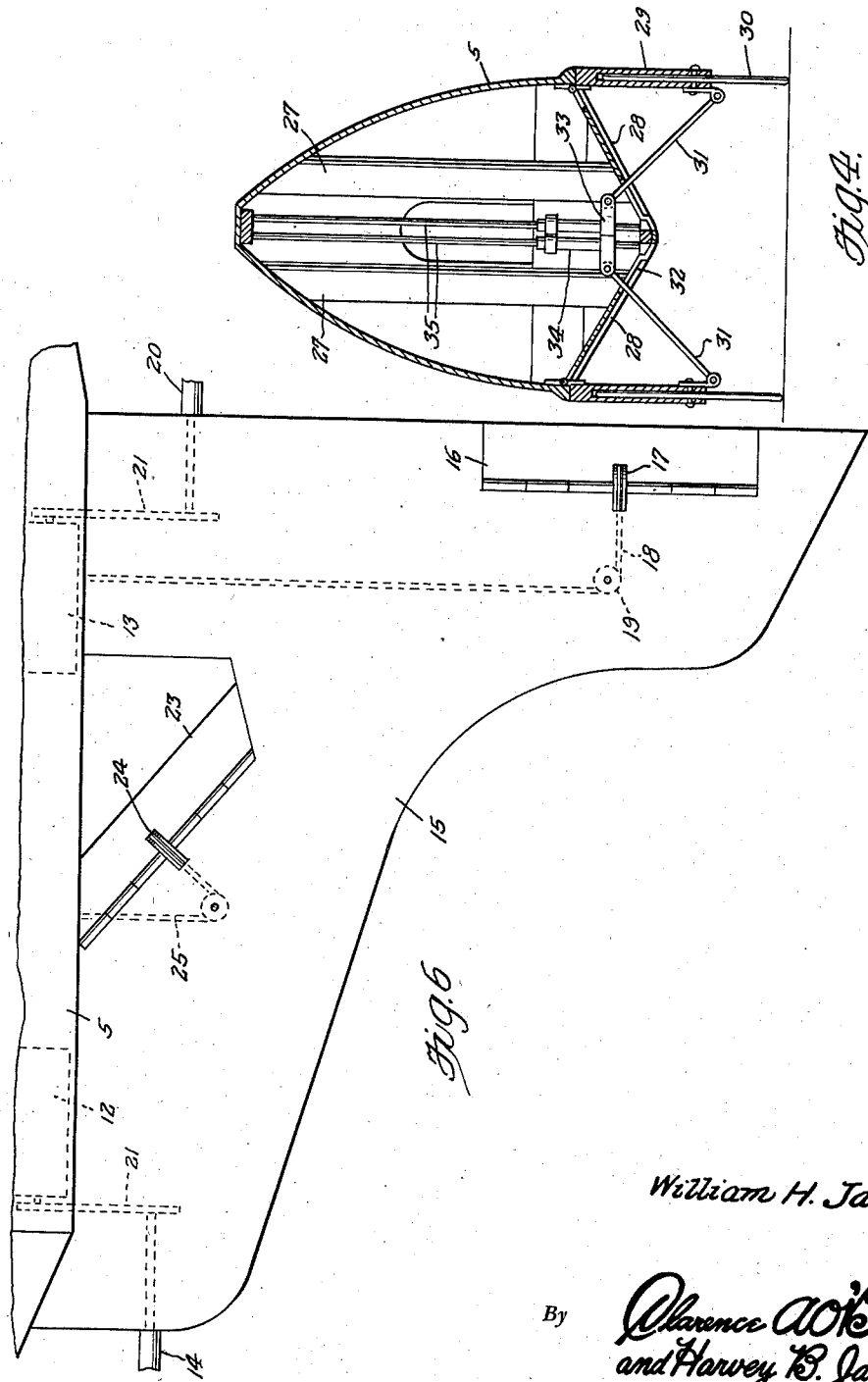

April 6, 1948. W. H. JACKSON 2,439,304
AEROPLANE EMPENNAGE
Filed Feb. 1, 1943 5 Sheets-Sheet 4
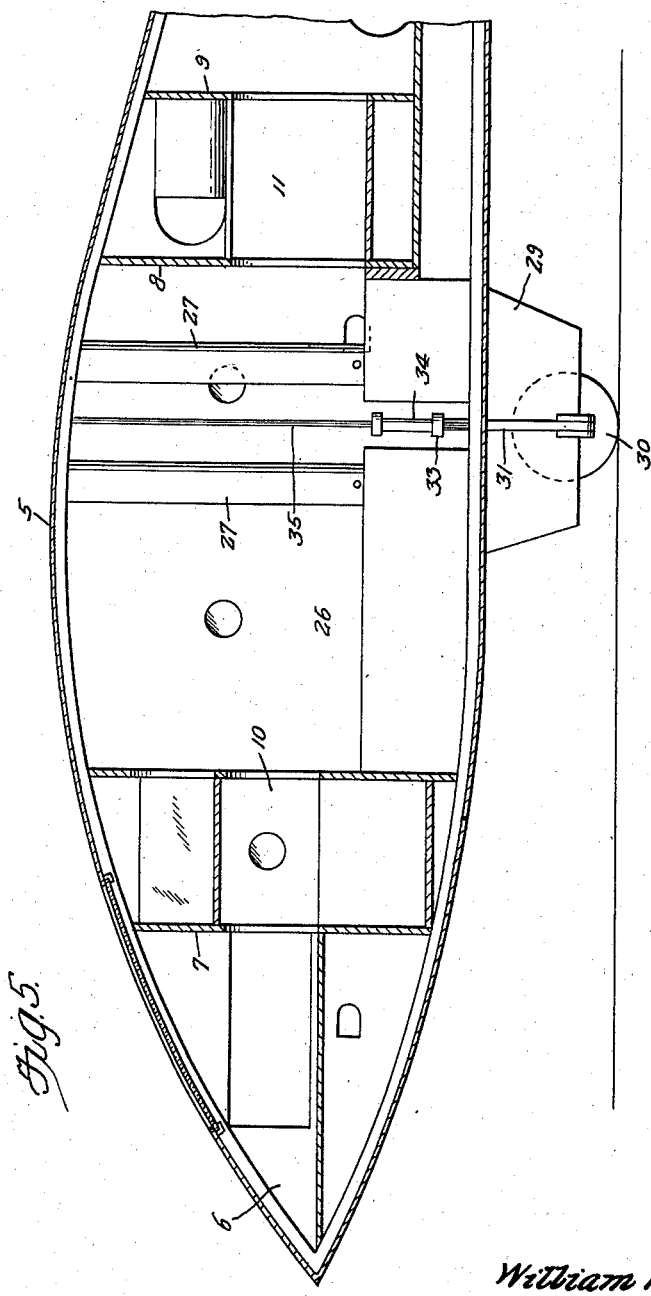
Inventor
William H. Jackson
By Clarence A. O'Brien
and Harvey B. Jacobson
Attorneys April 6, 1948.   W. H. JACKSON   2,439,304
AEROPLANE EMPENNAGE
Filed Feb. 1, 1943   5 Sheets-Sheet 5
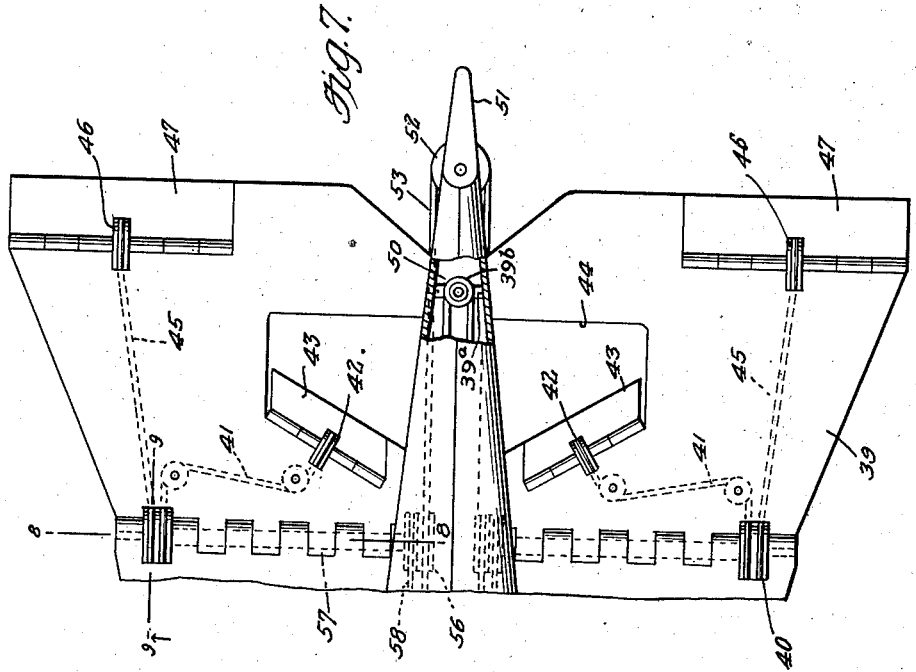
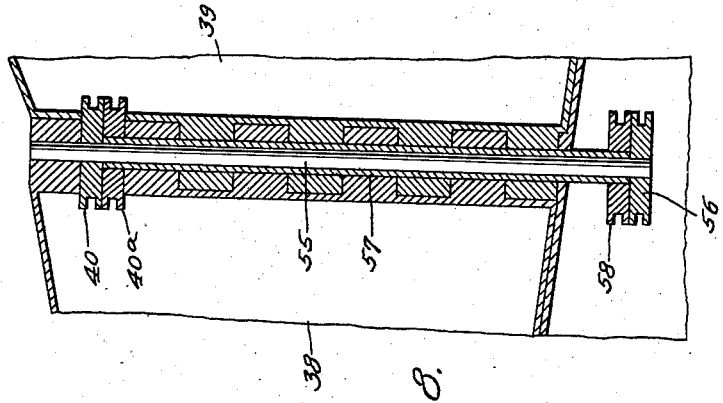
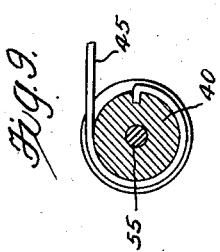
Inventor
William H. Jackson
By Clarence A. O'Brien
and Harvey B. Jacobson
Attorneys Patented Apr. 6, 1948

2,439,304

UNITED STATES PATENT OFFICE 2,439,304

AEROPLANE EMPENNAGE

William H. Jackson, Johnstown, Pa.

Application February 1, 1943, Serial No. 474,348

1 Claim. (Cl. 244—87)

This invention relates to new and useful improvements in aeronautics and more particularly to an aircraft which has safety as one of its principal objects.

Another important object of the invention is to provide an aeroplane wherein the motors are located within the fuselage with the purpose in view of always having the motors readily accessible and further to the end that they will not offer air resistance.

Another important object of the invention is to provide more convenient means for racking bombs in war planes.

Still another important object of the invention is to provide an aircraft which has auxiliary external controls for emergency use.

Other objects and advantages of the invention will become apparent to the reader of the following description.

In the drawings:

Figure 3 is a section on the line 3—3 of Figure 1.

Figure 4 is a transverse sectional view on the line 4—4 of Figure 1.

Figure 5 is a longitudinal vertical sectional view taken substantially on the line 5—5 of Figure 2.

Figure 6 is an enlarged fragmentary top plan view of one of the wings.

Figure 7 is a fragmentary top plan view (enlarged) of the tail structure.

Figure 8 is a fragmentary detailed sectional view (enlarged) taken substantially on the line 8—8 of Figure 7.

Figure 9 is a section on the line 9—9 of Figure 7.

Figure 1:
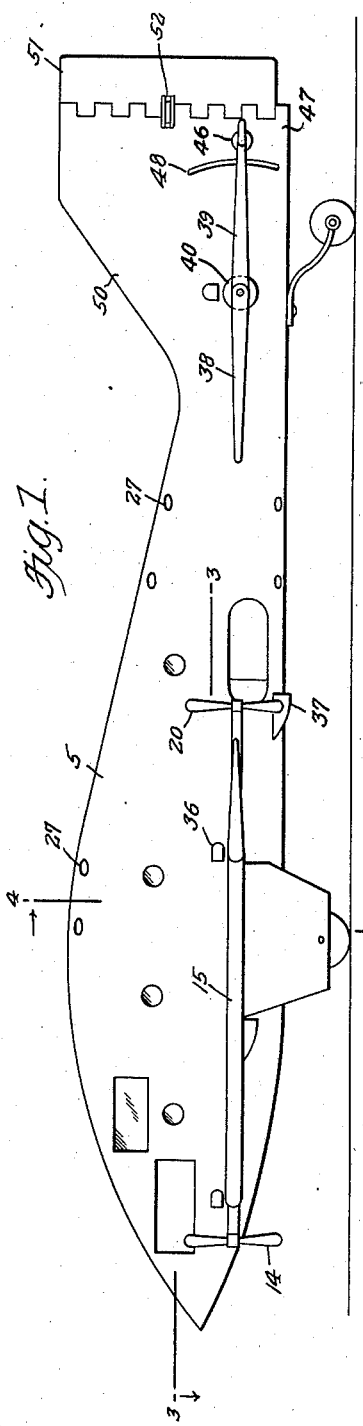
Figure 1 is a side elevational view.
Figure 2:
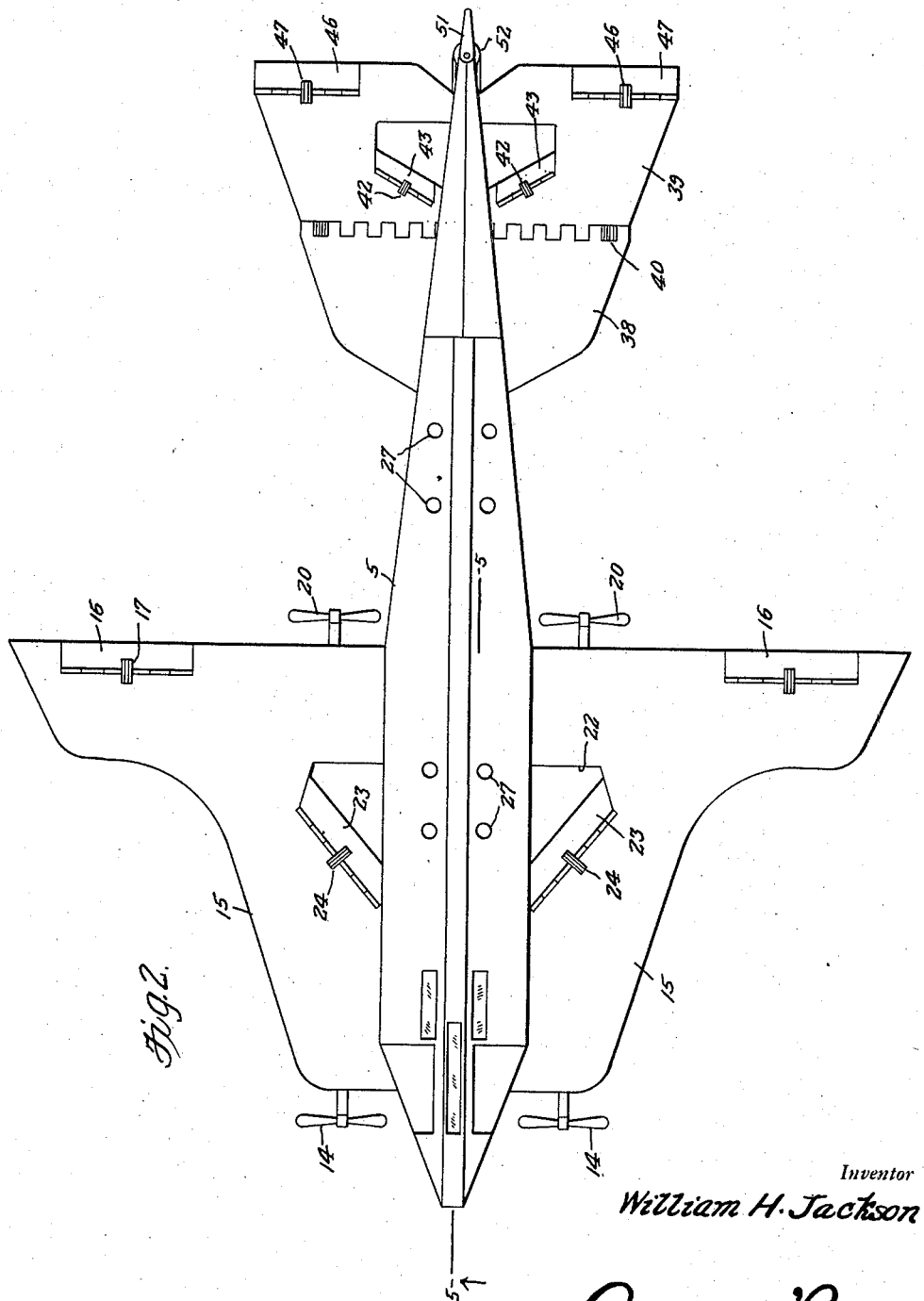
Figure 2 is a top plan view.

Referring to the drawings wherein like numerals designate like parts, it can be seen that numeral 5 denotes an elongated substantially cigar-shaped fuselage having a forward tapered nose portion defining a control compartment 6. The fuselage is divided by transverse walls 7, 7 and 8, 9 into fore and aft engine rooms 10, 11. In the room 10 are the forwardly located motors 12, 12, while in the aft room 11 are motors 13, 13. The fore motors 12, 12 are intended for driving the forward propellers 14 on the lead edges of wings 15, 15, which wings are substantially of wide L-shaped as substantially depicted in Figure 2. The trailing edges of these wings 15, 15 are provided with hinged ailerons 16 each having a pulley 17 over which a cable 18 is trained as suggested in Figure 6, this cable 18 extending to a suitable control in the chamber 6 and being trained over suitably located pulleys 19.

The rear motors 13 drive propellers 20 located at the trailing edges of the wings 15, 15 and it is preferable that a chain drive 21 be provided between the interiorly located motors and the propellers 20.

The forward wings 15, 15 are provided with emergency ailerons and these are located within openings of the wings 15, 15 close to the sides of the fuselage 5. These openings are denoted by numerals 22 and have oblique edge portions to which emergency ailerons 23 are hingedly secured, each aileron 23 having a pulley 24 and a cable 25 (see Figure 6) extending therefrom to a suitable control inside of the fuselage.

Between the motor rooms 10, 11 is a compartment 26 in which are a number of bomb chutes 27 which extend vertically through the fuselage. These bomb chutes 27 open through the bottom of the fuselage and may be loaded from above the fuselage and it is desirable that some suitable trip means be employed in conjunction with the chutes 27 so that bombs placed therein can be released whenever desired.

The underside of the fuselage 5, under the wings 15, is formed with pockets 28 for the reception of landing wheel shields 29 and companion landing wheels 30. The shields 29 have rods 31 extending therefrom and through slots 32 in the bottom of the fuselage 5 and these rods pivotally connect to a cross member 33 bridging a pair of sleeves 34, 34 located on vertical guide rods 35, 35 situated within the fuselage 5. Suitable means may be employed for elevating the sleeves 34, 34 on the rods 35, 35 for lowering the same as the requirement be in order to control the landing wheels.

It is preferable that suitable intake and exhaust ventilators 36, 37 be employed, especially for the motor rooms 10, 11.

This plane is provided with a tail structure which comprises horizontal fins 38 to each of which is hingedly secured an adjustable stabilizer 39 equipped with a pulley 40a from which a cable 41 extends to a pulley 42 located on an emergency elevator 43 situated within an opening 44 formed in the stabilizer 39 adjacent the tail portion of the fuselage. A cable 45 extends from a pulley 40 to a pulley 46 located on a hinged elevator 47 which is normally used. The adjustable stabilizers 39 have a connection 39a which extends through an arcuate slot 48 in the tail portion of the fuselage and has suitable adjusting means 39b associated therewith, as exemplified by the U. S. patent to J. M. Gwinn, Jr., No. 2,198,496.

The fuselage has an upstanding fin 50 at its tail portion and a rudder 51 controlled by a pulley 52 and cable 53 is located on the rear edge of this fin.

As can be seen in Figure 8, the pulleys 40 are located on a solid shaft 55 which are driven by pulleys 56 at their inner ends while surrounding the solid shafts are tubular shafts 57 at the outer ends of which are pulleys 40a over which the cables 41 are disposed. At the inner ends of the hollow shafts 57 are drive pulleys 58. The pulleys 56 and 58 are controlled by suitable means located in the compartment 6.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

In an aeroplane having a fuselage, a tail structure on the rear end of the fuselage, comprising a stationary vertical fin having a rudder hinged on the rear edge thereof and provided with a vertically disposed arcuate slot, stationary horizontal fins on opposite sides of the forward portion of said vertical fin, a vertically adjustable stabilizer hinged to the rear edge of each horizontal fin and having an opening, said slot being concentric with the hinge axis of said stabilizers, a connection between said stabilizers extending through said slot, an emergency elevator hinged on each stabilizer within said opening of the latter, a second elevator hinged on the rear edge of each stabilizer, relatively rotatable concentric shafts journaled in the hinge of each stabilizer and each having a pulley secured on the outer end thereof, a cable attached to one of said pulleys and connected to one of said elevators, a further cable attached to the other of said pulleys and connected to the other of said elevators, the inner ends of said shafts projecting into the vertical fin, and drive pulleys secured on the inner ends of said shafts and separately operable to selectively adjust the elevators of each stabilizer.

WILLIAM H. JACKSON.

REFERENCES CITED

The following references are of record in the file of this patent:

UNITED STATES PATENTS

| Number | Name | Date |
| --- | --- | --- |
| 1,311,576 | Petchon | July 29, 1919 |
| 1,581,564 | Dornier | Apr. 20, 1926 |
| 1,854,527 | Sorrell | Apr. 19, 1932 |
| 1,924,651 | Richter | Aug. 29, 1933 |
| 2,045,667 | Minshall et al. | June 30, 1936 |
| 2,057,877 | Bragunier | Oct. 20, 1936 |
| 2,064,729 | Carleton | Dec. 15, 1936 |
| 2,158,598 | Watter | May 16, 1939 |
| 2,198,496 | Gwinn | Apr. 23, 1940 |
| 2,322,745 | Rogallo | June 29, 1943 |

FOREIGN PATENTS

| Number | Country | Date |
| --- | --- | --- |
| 390,432 | Great Britain | Apr. 6, 1933 |